United States Patent
Coven

(10) Patent No.: US 9,545,177 B1
(45) Date of Patent: Jan. 17, 2017

(54) BATH TUB AND SHOWER INLAY

(71) Applicant: Steven R. Coven, Highland Park, IL (US)

(72) Inventor: Steven R. Coven, Highland Park, IL (US)

(*) Notice: Subject to any disclaimer, the term of this patent is extended or adjusted under 35 U.S.C. 154(b) by 184 days.

(21) Appl. No.: 14/192,061

(22) Filed: Feb. 27, 2014

Related U.S. Application Data

(60) Provisional application No. 61/771,224, filed on Mar. 1, 2013.

(51) Int. Cl.
- A47K 3/02 (2006.01)
- A47K 3/16 (2006.01)
- B29C 65/48 (2006.01)

(52) U.S. Cl.
CPC ............... *A47K 3/16* (2013.01); *B29C 65/484* (2013.01)

(58) Field of Classification Search
CPC ...................................................... A47K 3/001
USPC ...................................................... 4/538–595
See application file for complete search history.

(56) References Cited

U.S. PATENT DOCUMENTS

| | | | | |
|---|---|---|---|---|
| 5,012,537 A * | 5/1991 | Underwood | ............ | E03C 1/181 134/175 |
| 5,990,257 A * | 11/1999 | Johnston | ................ | C08G 18/10 528/28 |
| 6,162,938 A * | 12/2000 | Hansen | ................. | C07F 7/1836 556/419 |
| 7,176,269 B2 * | 2/2007 | Hakuta | ............. | B32B 17/10302 524/425 |
| 7,482,420 B2 * | 1/2009 | Porsch | ................... | C08G 18/10 528/28 |
| 7,776,431 B2 * | 8/2010 | Stockhelm | ............. | B29C 44/22 428/156 |
| 2002/0066140 A1 * | 6/2002 | Gerloff | .................... | A47K 3/16 4/613 |
| 2007/0014984 A1 * | 1/2007 | Stout | ....................... | B29C 73/02 428/353 |
| 2007/0266491 A1 * | 11/2007 | Gann | ....................... | A47K 3/40 4/613 |
| 2009/0178759 A1 * | 7/2009 | Provan, Jr. | ........ | B29C 66/73921 156/275.3 |
| 2009/0217452 A1 * | 9/2009 | Rubin | ................. | A47K 17/022 4/576.1 |
| 2010/0017956 A1 * | 1/2010 | Chen | ....................... | E03C 1/335 4/631 |

(Continued)

FOREIGN PATENT DOCUMENTS

GB 2086721 A * 5/1982 ............. A47K 3/001

OTHER PUBLICATIONS

NAPCO Inlay Installation Instructions, 2 pages (2010).

(Continued)

*Primary Examiner* — Lori Baker
(74) *Attorney, Agent, or Firm* — Brinks Gilson & Lione

(57) ABSTRACT

A kit for the repair of a tub or shower includes an inlay comprising a PVC thermoplastic and a one-part adhesive comprising an polyurethane-modified functional compound. A method for repairing a tub or shower use the kit to apply adhesive the inlay to secure it to the tub or shower floor. A preferred adhesive for use with the kit and the method exhibits excellent adhesion to many substrates including porcelain, steel, fiberglass and many plastics. Preferably, the adhesive cures fast, even at low temperatures, contains no solvents or isocyanates and is non-yellowing.

10 Claims, 2 Drawing Sheets

(56) References Cited

U.S. PATENT DOCUMENTS

| | | | | |
|---|---|---|---|---|
| 2010/0071125 A1* | 3/2010 | Miller | A47K 3/40 | |
| | | | 4/613 | |
| 2010/0210745 A1* | 8/2010 | McDaniel | C09D 5/008 | |
| | | | 521/55 | |
| 2011/0079663 A1* | 4/2011 | Cabrera | C08G 18/837 | |
| | | | 239/337 | |
| 2011/0240064 A1* | 10/2011 | Wales | C09D 5/14 | |
| | | | 134/26 | |
| 2011/0250626 A1* | 10/2011 | Williams | A01N 63/02 | |
| | | | 435/18 | |
| 2012/0097194 A1* | 4/2012 | McDaniel | A01N 63/02 | |
| | | | 134/26 | |
| 2014/0075666 A1* | 3/2014 | Campbell | A47K 3/40 | |
| | | | 4/613 | |

OTHER PUBLICATIONS

Technical Data Sheet, 3M™ 700 Series Hybrid Products: Hybrid Sealant 730, Clear Hybrid Sealant 704 Hybrid Sealant 755 Hybrid Sealant 755 FC Hybrid Adhesive Sealant 760, 1 page (2009).

Material Safety Data Sheet Brochure, MANUS-BOND 75 AM; (White, gray, black) High Performance Elastomeric Adhesive/Sealant, 6 pages (2009).

Technical Data Sheet Brochure, MANUS-BOND 75-AM, Industrial Grade High performance Elastomeric Adhesive/Sealant, Technical Data, 2 pages (2009).

Material Safety Data Sheet Brochure, 3M™ Hybrid Adhesive Sealant 760, White, Gray and Black, 8 pages, Dec. 1, 2011.

Technical Data Sheet Brochure, Rudolph Brother's & Co., RB75 Adhesive, 1 page (2010).

NAPCO, Material Safety Data Sheet, Product: Inlay Adhesive Glue, 6 pages (Nov. 2010).

\* cited by examiner

BATH TUB AND SHOWER INLAY

CROSS-REFERENCE

This application claims the benefit under 35 USC §119 of U.S. provisional patent application No. 61/771,224, filed Mar. 1, 2013.

BACKGROUND

This invention relates to bath tub and shower repairs.

When a bath tub or shower floor is cracked, dented or stained, it can be repaired by placing a new floor over the old floor. Typically, the new floor is a plastic inlay with the same shape and dimension of the existing floor with contours or cut-outs to allow spacing for drains. The inlay is glued over the existing tub or shower floor. Most applications requiring permanent adhesion use a fiberglass or PVC inlay for a fiberglass or acrylic tub or shower floor surface. In this application, a two-part adhesive is utilized, which typically contains methacrylate. The two-part adhesive has several disadvantages, because it may be flammable, have a strong odor, contain significant quantities of volatile organic compounds, have a short shelf life and may be difficult to work with.

BRIEF SUMMARY

One purpose of the improved inlay is to quickly and permanently repair broken bathtub and shower floors making them safer and saving thousands of dollars over replacement. Moreover, this improved inlay product may be installed without special tools or training by following a few simple instructions. One embodiment of this invention includes a kit with an inlay made from an PVC thermoplastic sheet cut to a dimension compatible with a shower or tub floor to be repaired, and a one-part adhesive material comprising an polyurethane-modified functional compound. Another embodiment of this invention includes a method of repairing a tub or shower using this inlay and adhesive.

Additional embodiments of this invention and other advantages therefrom will be apparent from the following detailed description.

DETAILED DESCRIPTION OF THE DRAWINGS AND THE PRESENTLY PREFERRED EMBODIMENTS

An inlay is a piece of a thermoplastic sheet cut to fit in the floor of a shower or a bath tub. In a preferred embodiment, the inlay is made from an acrylic/PVC alloy thermoplastic sheet having a number of designations, which may incorporate a mixture of vinyl thermoplastic sheet, polyvinyl chloride, chlorinated polyvinyl chloride, acrylic polymer, polymethylmethacrylate, processing aids, impact modifiers, heat stabilizers, lubricants and/or pigments. These combined ingredients are commonly rolled out into 4'×8' sheets measuring in thickness from 0.040" to 0.080". Preferably, the sheets are smooth on one side and on the other side contains a roughened or patterned surface, such as for example, a hair cell pattern, which helps creates a non-slip surface.

It is important for the inlay to withstand extreme conditions which include heavy weight, falling objects, and rapid temperature changes ranging from 45° F. to 120° F. The inlay should also be able to withstand constant exposure to water and water pressure without deforming. Exemplary ASTM standards, which allow for these conditions, are listed below in Table 1.

TABLE 1

| Property | Test Method | Typical Value |
| --- | --- | --- |
| Tensile Strength | ASTM D-792 | 6,100 psi |
| Notched Izod Impact Resistance @ 73 | ASTM D-256 | 18 ft-lbs./in |
| Flexural Strength | ASTM D-790 | 9,100 psi |
| Rockwell Hardness (R Scale) | ASTM D-785 | 94 |
| Flammability: U.L. Component Recognition | UL Standard 94[2] | V-0,5V[3] |

In the interest of public safety, it is also important for the inlay material to be non-flammable. In consideration of this attribute, the inlay material should have a high flashpoint. For example, a preferred PVC/acrylic alloy material has a flashpoint of greater than 700° F. One example of an acrylic/PVC alloy thermoplastic sheeting useful as inlay material is commercially available as an inlay under the designation NAPCO Inlay from North American Polymer Company, Ltd. of Skokie, Ill.

This process to fabricate the inlay includes cutting these sheets, for example using a CNC machine, to a variety of sizes and shapes and finishing each with a beveled edge. The design which is created is called an inlay. The inlay is used to cover the bottom of broken bathtub or shower floors. The inlay will frequently match the approximate size and dimensions of the floor of the tub or shower. The inlay may however be manufactured in a standardized size so that specific dimensions of a particular bathtub or shower floor do not need to be known in advance. If it is found that the inlay is too large, a portion of the inlay near the edge may be trimmed off with scissors and the new edge sanded down to a beveled finish.

Figures 1A, 1B:
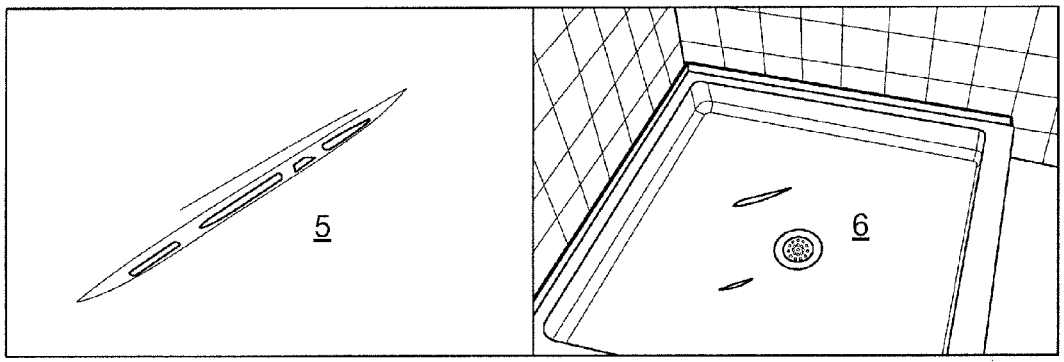
FIGS. 1A through 1F illustrate the before, during and after installation of an inlay to repair a cracked bath tub floor and a split shower floor
Figures 1C, 1D:
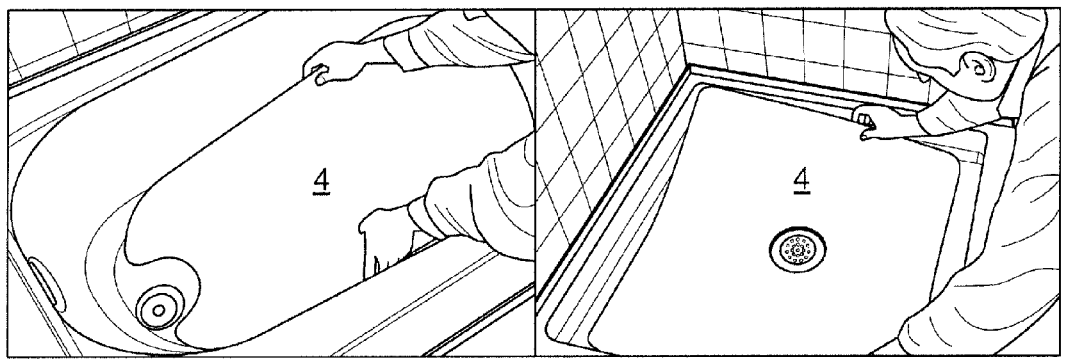
Figures 1E, 1F:
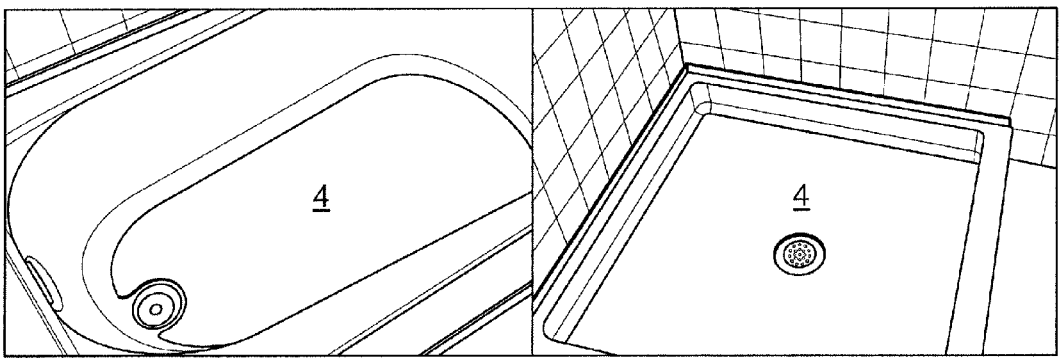

FIGS. 1A through 1F illustrate the before (1) (FIGS. 1A, 1B), during (2) (FIGS. 1C, 1D), and after (3) (FIGS. 1E, 1F) images of installing an inlay 4 on a tub bottom 5 or shower floor 6. FIGS. 1A and 1B illustrate cracks from inexpensive fixtures or improper installation; FIGS. 1C and 1D illustrate inlays which are precision manufactured for ease of installation; and FIGS. 1E and 1F illustrate the affixed precision manufactured inlays. Step one of the installation process for the inlay includes cleaning the damaged surface of the existing tub or shower to remove all dirt and contaminants. Step two includes sanding the surface of the tub or shower floor where the inlay is to be installed with wet/dry sand paper. Optionally, the smooth bottom surface of the inlay may also be sanded. The purpose of this is to roughen the surfaces making the bond between the inlay and the special adhesive more secure. Step three includes removing all sanding debris and drying the surface. Step four includes applying a special adhesive specifically researched and designed for the installation of the inlay.

Most applications requiring permanent adhesion of a PVC thermoplastic inlay to a fiberglass or acrylic surface utilize a two-part adhesive, typically containing methacrylate, which is flammable, has a strong odor, contains significant quantities of volatile organic compounds has a short shelf life and is difficult to work with. As used in this description, permanent is meant to mean for the life of the tub or shower, which in the case of a fiberglass or acrylic tub or shower is usually between 15 and 30 years. Some adhesives that do not function well may permanently remain gooey or tacky after application, which allows the inlay to possibly move around and leak. Other adhesives that do not function well may over-harden and become brittle or cracked over time causing the inlay to loosen and fail.

In a preferred embodiment of this invention, the adhesive is a one part adhesive and performs as a sealant and caulk at the same time. Moreover, this adhesive preferably has virtually no odor, is non-flammable, low volatile organic compound content, has a long shelf life and is easy to work with. This adhesive creates a permanent bond while remaining flexible. This adhesive sets in 3 to 4 hours, is completely cured and usable within 24 hours for showers or bathing at normal temperatures and humidity. The adhesive is typically prepared and sold in a standard caulk tube and applied using a standard caulk gun.

Preferably, one example of the adhesive useful for this process is known as a one-part adhesive and contains modified polyurethane, such as a silyl-terminated polyurethane. Optionally, the adhesive may contain calcium carbonate as a filler and titanium dioxide for color. The adhesive preferably contains no solvents, no plasticizers and/or no free-isocyanates. Preferably, the adhesive has a low viscosity at room temperatures making it easy to spread and coat the tub floor and/or bottom of the inlay. Preferably, the adhesive comprises more than 5 wt. %, 10 wt. % or 15 wt. % and less than 40 wt. %, 30 wt. %, 25 wt. % or 20 wt. % of a silyl-terminated polyurethane more than 50 wt % or 60 wt. % and less than 90 wt. %, 80 wt. % or 70 wt. % calcium carbonate, and is isocyanate-free, which is believed, in other words, to be free of unreacted isocyanates. Optionally, the adhesive may include less than 10 wt. % of titanium dioxide and other coloring agents. Optionally, the adhesive may include more than 1 wt. %, 5 wt. %, 10 wt. % or 15 wt. % and less than 25 wt. % or 20 wt. % of a plasticizer. Preferably, the adhesive has a viscosity of more than 25,000 cP and less than 500,000 cP at 5 RPMs. Preferably, the adhesive cures fast with a skin time of less than 30 minutes and a tack free time of less than 60 minutes, both at 77° F. and 50% relative humidity. One example of an adhesive useful for this process is commercially available under the designation NAPCO One-Part Inlay Adhesive from North American Polymer Company, Ltd. of Skokie, Ill.

Other examples of curable adhesives that may be useful with other embodiments of this invention include silyl-terminated or end-capped polyurethane compounds such as described in U.S. Pat. No. 5,990,257 to Johnston et al. and U.S. Pat. No. 7,482,420 to Porsch et al., which are incorporated herein by reference.

Continuing with the above-mentioned step four, the adhesive is applied onto the floor of the tub or shower. A notched plastic spreader is commonly used to ensure the adhesive is thoroughly spread over entire surface. Preferably, a consistent, unending bead of adhesive around the perimeter edge of the inlay is applied to ensure a seal around the outer edge of the inlay. Step five includes carefully placing the inlay into the bathtub or shower with the smooth side or sanded surface of the inlay facing down and pressing firmly into place making sure the inlay is centered. Work the inlay by pressing the hands firmly in the center and pushing outward until adhesive can been seen oozing out on all sides. Step six includes obtaining a solvent, such as Isopropyl Alcohol, and a plastic scraper or caulk removal tool, and then removing excess adhesive with a paper towel and Isopropyl Alcohol, frequently removing excess buildup from the plastic tool. At normal temperature and humidity, the adhesive may be exposed to water after 15 hours and submerged (e.g., taking a bath) after 24 hours. The inlay may be painted before or after installation. The adhesive may be painted immediately after installation while still wet.

Once installed, the inlay will permanently fix the leak, increase the strength of the floor to a greater value than the original, make the surface safer and put the fixture back into service quickly.

Figure 2:
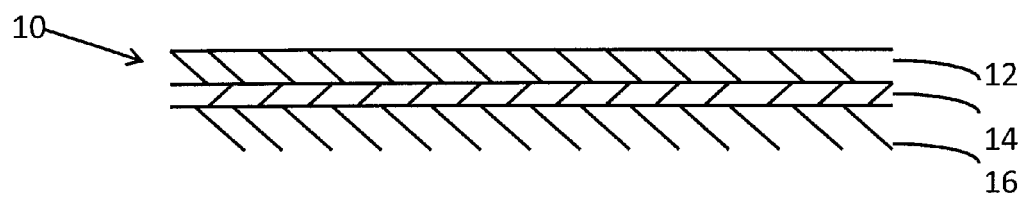
FIG. 2 is a cross-section of an inlay set on a tub floor with adhesive.

FIG. 2 illustrates a cross-sectional view of a repaired tub floor 10 in accordance with an embodiment of the invention. A thermoplastic inlay 12 sits on a thin film of adhesive 14, which has been applied to the bottom of a tub floor 16 in need of repair. After curing, the adhesive 14, in one preferred embodiment, such as the NAPCO One-Part Inlay Adhesive, has a tensile strength of 225 psi, lap shear of 275 psi, and elongation of about 275%. The cured adhesive is resistant to high temperatures of up to 400° F. for short periods, retains is flexibility at low temperatures down to −75° F., and has a Hardness Shore A rating of 45-50.

The inlay may be included as part of a kit including adhesive and optionally other materials for installation of the inlay. In a preferred embodiment, the kit may be a bathtub floor repair kit containing a flexible and permanent anti-slip, non-metal inlay floor, a marine-grade tube of adhesive, an adhesive spreader, a pair of rubber gloves, sandpaper and instructions for use. Preferably, the inlay and adhesive are as described above. The instructions for use may include a description of the method described above or other methods. In a preferred embodiment, the instructions for use provided in the kit may be as listed in the following example in Table 2:

TABLE 2

NAPCO Instant Shower Floor Repair Kit
INSTALLATION INSTRUCTIONS

Instant Shower Floor Repair Kit Includes:
Inlay Floor Bottom; Sandpaper; Adhesive; Disposable gloves - 1 pair;
Plastic notched spreader;
Other Important Materials Needed for Installation:
Denatured Alcohol; Pencil; Household cleaner; Roll of paper towels;
Caulk Gun;
Installation Instructions:
1. Thoroughly clean the bathtub/shower bottom with Household Cleaner (e.g., Dish Soap or Soft Scrub), a sponge and water.
2. For Showers with large cracks, use a bucket with cleaner to prevent significant amounts of water from seeping beneath the Shower.
3. Rinse the bathtub/shower well and dry the bathtub/shower bottom completely.
4. Dry fit the Inlay Floor on shower floor to ensure a good fit.
5. If Inlay Floor does not lay flat on shower floor, carefully trim the edges with a heavy duty scissors and sand edge with 80 or 120 grit sandpaper until cut edge is beveled and smooth to match rest of Inlay Floor.
6. Lay the Inlay Floor in place and make sure it is straight and centered. With a pencil,lightly trace the outline of the Inlay Floor onto the existing shower floor. Remove the Inlay Floor.
7. Sand the smooth side of Inlay bottom making the surface rough. Remove all dust using paper towel moistened with denatured alcohol.
8. Sand the damaged shower bottom up to the pencil line with included sandpaper. Sand inside the pencil line only.
9. Inspect the surface to make sure it is clean, dry, sanded, and dust-free.
10. Cut the top 1" to 1.5" off the top of the adhesive tube and puncture the foil seal inside the opening. Place tube into caulk gun.
11. Apply a bead of adhesive around the perimeter of the bathtub/shower bottom, staying ¼" inside the pencil line.

TABLE 2-continued

NAPCO Instant Shower Floor Repair Kit
INSTALLATION INSTRUCTIONS

Apply a 2nd bead of adhesive 1" inside the pencil line. Then apply beads of adhesive horizontally (side to side/shortest distance) every 4" to 5" throughout the length of the bathtub/shower floor. Use all the adhesive.
12. Drag the plastic notched spreader through the lines of adhesive, spreading adhesive evenly over the entire outlined area of the bathtub/shower bottom. Spread adhesive right up to the pencil line.
13. Place the Inlay bottom sanded side down onto the outlined area of the bathtub/shower floor.
14. Stand up and make sure the Inlay Floor looks straight. If not, adjust it by sliding the Inlay Floor into position and push down firmly on the surface of the bathtub/shower floor.
15. Use your hand to push from the center of the Inlay Floor bottom out to the edges, forcing out any air bubbles or excess adhesive. Note: You must have adhesive coming out all the way around the Inlay Floor bottom in order to ensure that the Inlay Floor bottom will completely seal itself to the bathtub/shower floor and have good adhesion. If there is an area where adhesive is not coming out, lightly lift that area of the Inlay Floor bottom with your fingers and use the spreader to apply some of the excess adhesive under the edge of the Inlay Floor bottom.
16. Slide the plastic spreader forward like a mini snow shovel around the edges of the Inlay Floor bottom, scooping up excess adhesive. Frequently wipe excess adhesive off the spreader using a paper towel moistened with denatured alcohol.
17. Dampen paper towels with denatured alcohol and wipe along the edges of the Inlay Floor bottom to remove the remaining thin layer of adhesive. Use plenty of fresh damp paper towels.
18. Inspect the job once you have finished removing the excess adhesive.
19. It is highly recommended placing heavy objects on the edges, overnight, to ensure a good bond with the shower floor. Five or six one-gallon bottles of water work well for this purpose.
20. Wait 12 hours before showering and 24 hours before taking a bath.

The above examples are illustrative only, and should not be interpreted as limiting since further modifications of the disclosed embodiments will be apparent to those skilled in the art in view of this disclosure. All such modifications are deemed to be within the scope of the embodiments disclosed herein. Moreover, the advantages described herein are not necessarily the only advantages, and it is not necessarily expected that every embodiment will achieve all of the advantages described.

The invention claimed is:

1. A kit for installation of a fiberglass or acrylic tub or shower inlay comprising:
   an inlay comprising a PVC-containing thermoplastic sheet cut to a dimension compatible with a tub or shower floor to be repaired; and
   a one-part adhesive comprising a polyurethane modified functional compound, wherein the adhesive comprises less than 30 wt. % of silyl-terminated polyurethane, less than 70 wt. % calcium carbonate, is isocyanate-free and has a viscosity of less than 500,000 cP at 5 RPM.

2. The kit according to claim 1 wherein the adhesive comprises between 10 wt. % and 30 wt. % of silyl-terminated polyurethane, and between 50 wt. % and 70 wt. % calcium carbonate.

3. The kit according to claim 2 further comprising an adhesive spreader, a pair of rubber gloves, sandpaper and instructions for use.

4. A kit for installation of a fiberglass or acrylic tub or shower inlay consisting essentially of:
   an inlay comprising a PVC-containing thermoplastic sheet cut to a dimension compatible with a tub or shower floor to be repaired;
   a one-part adhesive comprising a polyurethane modified functional compound, wherein the adhesive comprises between 10 wt. % and 30 wt. % of silyl-terminated polyurethane, and between 50 wt. % and 80 wt. % calcium carbonate;
   an adhesive spreader;
   a pair of rubber gloves;
   sandpaper; and
   instructions for use.

5. A method for repairing a tub or shower made from fiberglass, acrylic, iron, steel and/or porcelain, the method comprising:
   providing a PVC-containing thermoplastic inlay cut to a dimension compatible with a tub or shower floor to be repaired;
   providing a one-part adhesive comprising a polyurethane modified functional compound, wherein the adhesive comprises less than 30 wt. % of silyl-terminated polyurethane, less than 70 wt. % calcium carbonate, is isocyanate-free and has a viscosity of less than 500,000 cP at 5 RPM;
   preparing the tub or shower floor for the inlay;
   coating adhesive on the tub or shower floor;
   pressing the adhesive-coated inlay against the tub or shower floor; and
   allowing time for the adhesive to cure before using the tub or shower.

6. A method for repairing a tub or shower made from fiberglass, acrylic, iron, steel and/or porcelain, the method comprising:
   providing a PVC-containing thermoplastic inlay cut to a dimension compatible with a tub or shower floor to be repaired;
   providing a one-part adhesive comprising a polyurethane modified functional compound, wherein the adhesive comprises between 10 wt. % and 30 wt. % of silyl-terminated polyurethane, and between 50 wt. % and 80 wt. % calcium carbonate;
   preparing the tub or shower floor for the inlay;
   coating adhesive on the tub or shower floor;
   pressing the adhesive-coated inlay against the tub or shower floor; and
   allowing time for the adhesive to cure before using the tub or shower.

7. The method according to claim 5, wherein after curing the adhesive comprises a tensile strength of 225 psi, lap shear of 275 psi, and elongation of about 275%.

8. The method according to claim 5, wherein after curing the adhesive comprises a Hardness Shore A rating of between 45 and 50.

9. The method according to claim 6, wherein after curing the adhesive comprises a tensile strength of 225 psi, lap shear of 275 psi, and elongation of about 275%.

10. The method according to claim 6, wherein after curing the adhesive comprises a Hardness Shore A rating of between 45 and 50.

* * * * *